SERIAL CRYOGENIC BINARY MULTIPLIER SYSTEM

Filed Dec. 22, 1961 6 Sheets-Sheet 1

INVENTORS
ROBERT I. ROTH
HAROLD FLEISHER
BY Curtis Ailes Jr.
ATTORNEY

SERIAL CRYOGENIC BINARY MULTIPLIER SYSTEM

FIG. 3
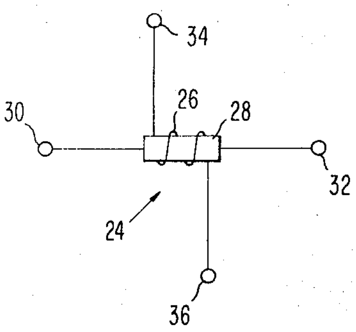
FIG. 4
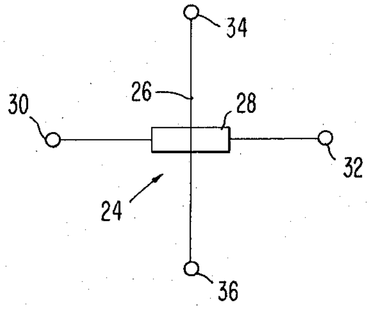
FIG. 5
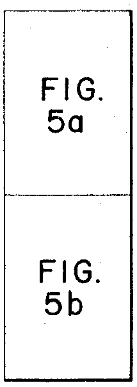
FIG. 5a
FIG. 5b
FIG. 6
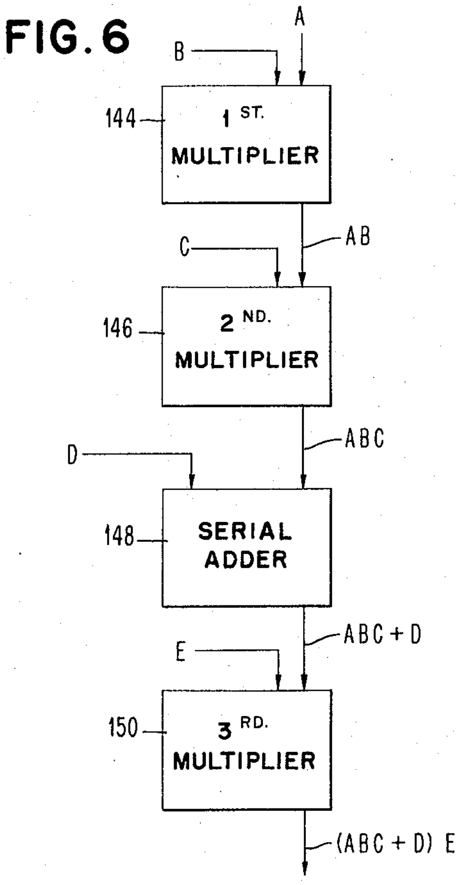

March 7, 1967 R. I. ROTH ET AL 3,308,282

SERIAL CRYOGENIC BINARY MULTIPLIER SYSTEM

Filed Dec. 22, 1961 6 Sheets-Sheet 4

March 7, 1967 R. I. ROTH ET AL 3,308,282

SERIAL CRYOGENIC BINARY MULTIPLIER SYSTEM

Filed Dec. 22, 1961 6 Sheets-Sheet 6

United States Patent Office 3,308,282
Patented Mar. 7, 1967

3,308,282
SERIAL CRYOGENIC BINARY MULTIPLIER SYSTEM

Robert I. Roth, Briarcliff Manor, and Harold Fleisher, Poughkeepsie, N.Y., assignors to International Business Machines Corporation, New York, N.Y., a corporation of New York Filed Dec. 22, 1961, Ser. No. 161,674
8 Claims. (Cl. 235—164)

This invention relates to serially operable arithmetic systems and particularly to arithmetic systems for rapid multiplication.

In computing machines, serially operable arithmetic units have been commonly known which are generally based upon a serially operable adder. So-called serially operable multipliers have also been known and they have generally been based upon a series of repetitive adding operations for adding partial products to form the complete product. It is for this reason that such machines are usually expected to take much longer for multiplication than for addition. This is obviously disadvantageous, particularly in a system where a series of arithmetic operations are to be performed, because the rest of the system must stop and wait while the multiplication is completed.

Accordingly, it is an object of the present invention to provide a serial multiplier which is much more rapid in operation than prior serial multipliers.

It is another object of the present invention to provide a rapid serial multiplier which operates essentially with the same speed as a serial adder.

Another object of the present invention is to provide a serial multiplier which is capable of storing a multiplier, and a receiving a multiplicand in serial digit by digit fashion, and of delivering a complete product in serial digit by digit fashion with a minimum delay.

Another object of the present invention is to provide an arithmetic system which is capable of a series of multiplication steps which may be performed with a high degree of simultaneity.

As mentioned above, in serially operable computing machines, some arithmetic steps are expected to take longer than others. For instance, multipliers are generally expected to take much longer to perform a multiplication than adders are expected to take for performing an addition. For this reason, if a serially operable adder is expected to receive and add the output from a serially operable multiplier, the adder must generally wait, and be idle, while the product from the multiplier is being generated.

Accordingly, it is another object of the present invention to provide arithmetic systems which may employ intermixed successive steps of different arithmetic operations in which the steps are performed at substantially the same rate.

Another object of the present invention is to provide an arithmetic system which may employ intermixed successive steps of multiplication and addition with multipliers and adders in which the multiplers may operate at substantially the same speed as the adders.

Another object of the present invention is to provide systems of the above description which employ only digital devices instead of analogoue devices.

Another object of the present invention is to provide systems of the above description which may be embodied in cryogenic devices.

In carrying out the above objects of this invention in one preferred embodiment thereof there may be provided a serially operable binary multiplier system including a register having flip-flop for storing the digits of the multiplier and a register having flip-flops for storing the digits of the multiplicand, and in which at least one of the registers is a shift register. The individual digit flip-flops of the multiplier register are paired in ascending digital order with individual digit flip-flops of the multiplicand register in descending digital order, and each pair is connected to an individual coincidence circuit.

There is included a multiple digit adder having at least one counting network connected to receive the outputs from all of the coincidence circuits and operable to generate a count of all the one digits indicated thereby, and having a coding network connected to receive the count from the counting network and operable to generate binary sum digits and carry digits representative of the count.

The system is operable to read out digits from each of the registers at a read cycle time indicating a coincidence of ones in the flip-flop pairs for the generation of a sum representing the sum of one column of an array of partial products. The registers are operable to provide a relative shift of one digit position between the multiplier and the multiplicand after read cycle time to then cause the representation of the next higher order of the array of partial products. And delay storage apparatus is provided which is connected to receive and store each carry digit for additon in the adding circuit on a subsequent read cycle.

Further objects and advantages of the present invention will be apparent from the following description and the accompanying drawings which are briefly described as follows:

FIG. 1 is a logical functional block diagram of a serial multiplier in accordance with the present invention.

FIGS. 2*a*, 2*b*, 2*c*, and 2*d* are diagrams illustrating successive steps in the mathematical operation of the system of FIG. 1.

FIG. 3 illustrates, in schematic form, a cryotron, a four terminal device which is useful in the construction of physical embodiments of the present invention.

FIG. 4 is a simplified representation of the cryotron of FIG. 3 which is employed in FIGS. 5 and 7 relating to cryogenic embodiments of the present invention.

Figure 1:
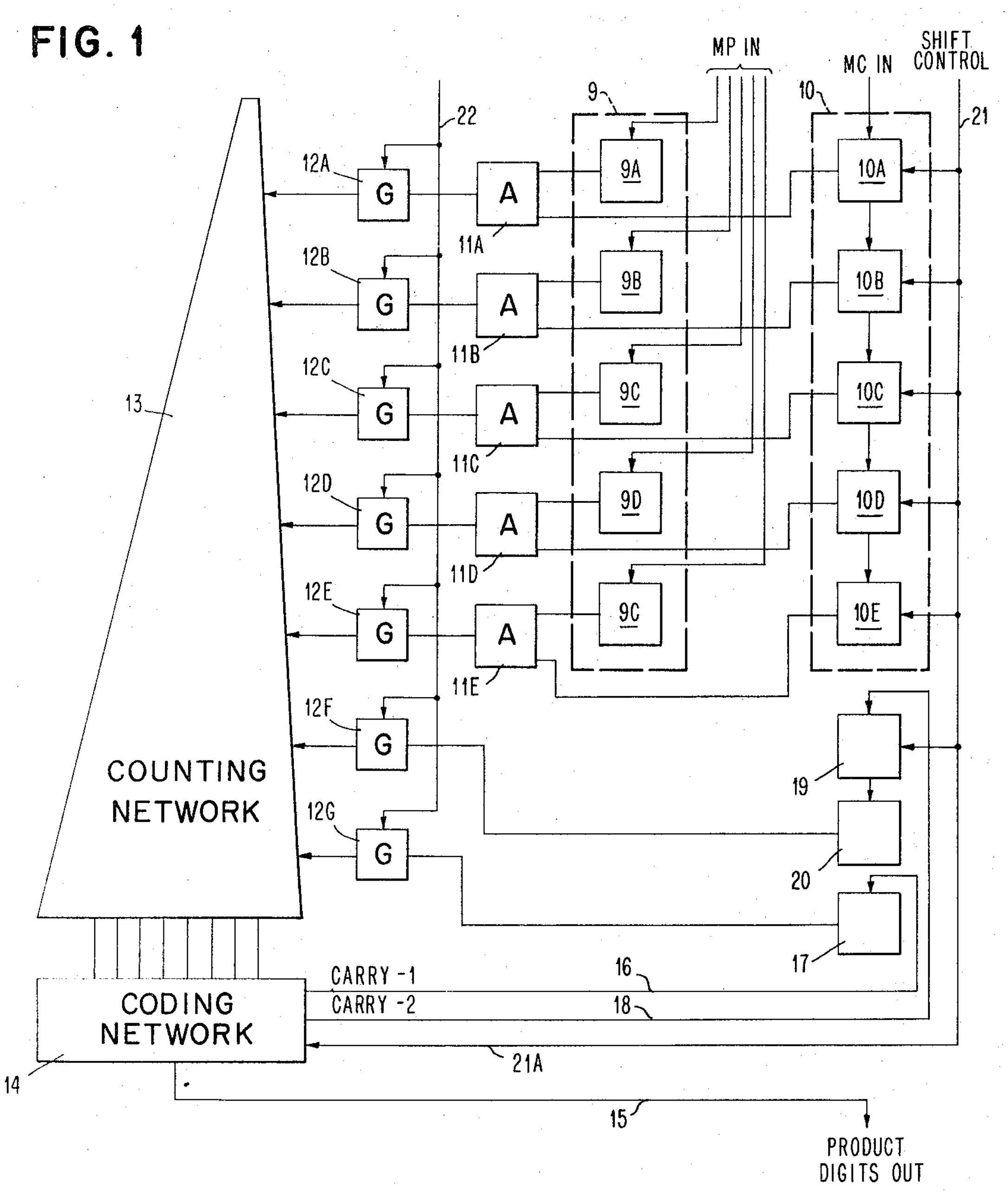
Figure 5A:
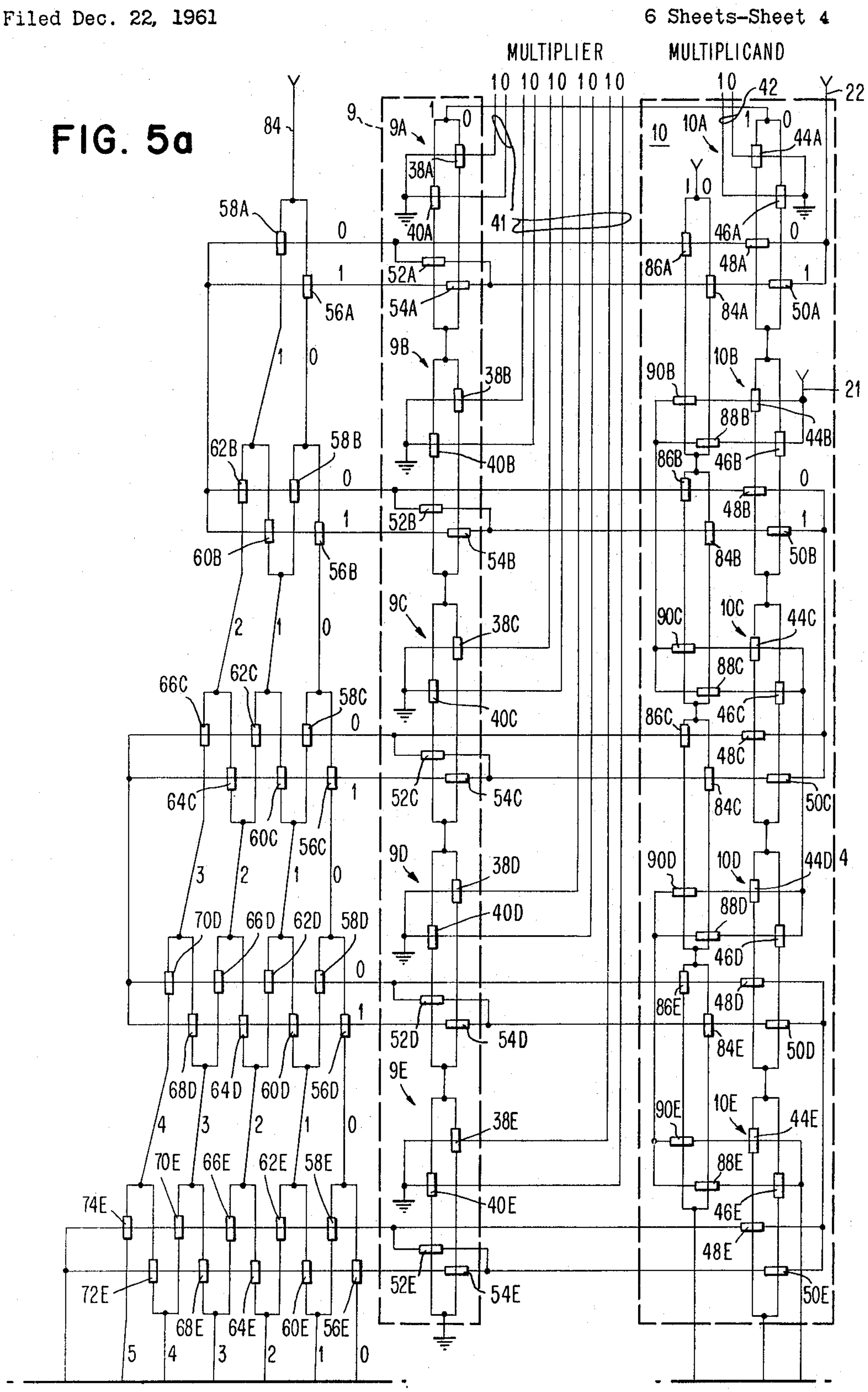
Figure 5B:
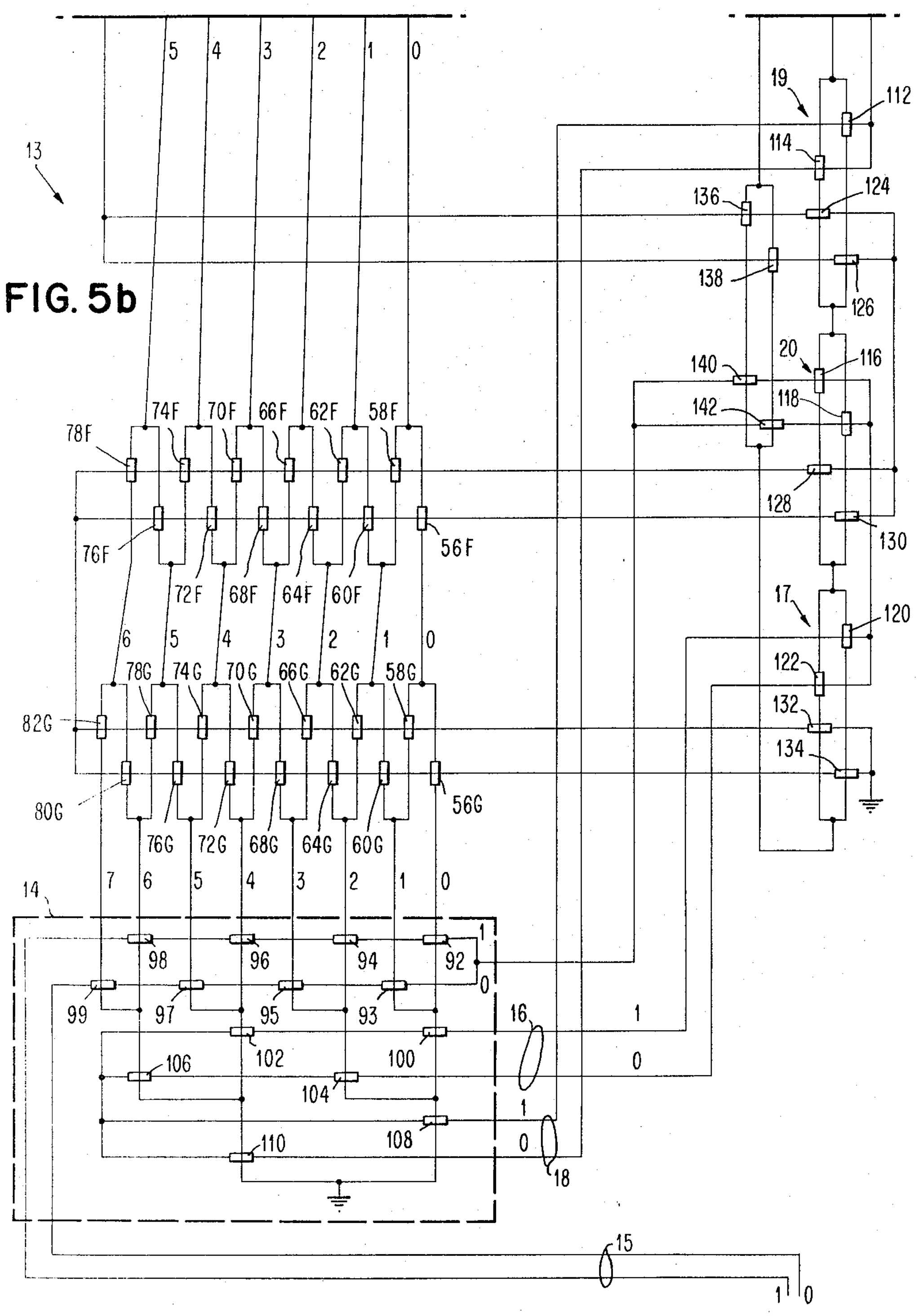

FIG. 5 which is composed of a combination of FIGS. 5*a* and 5*b* is a schematic circuit diagram of a cryogenic embodiment of the multiplier of FIG. 1.

FIG. 6 is a schematic block diagram showing how a series of multipliers in accordance with the present invention may be interconnected with one another and with other arithmetic units such as an adder to derive involved mathematical functions in a continuous serial streaming operation.

Figure 7:
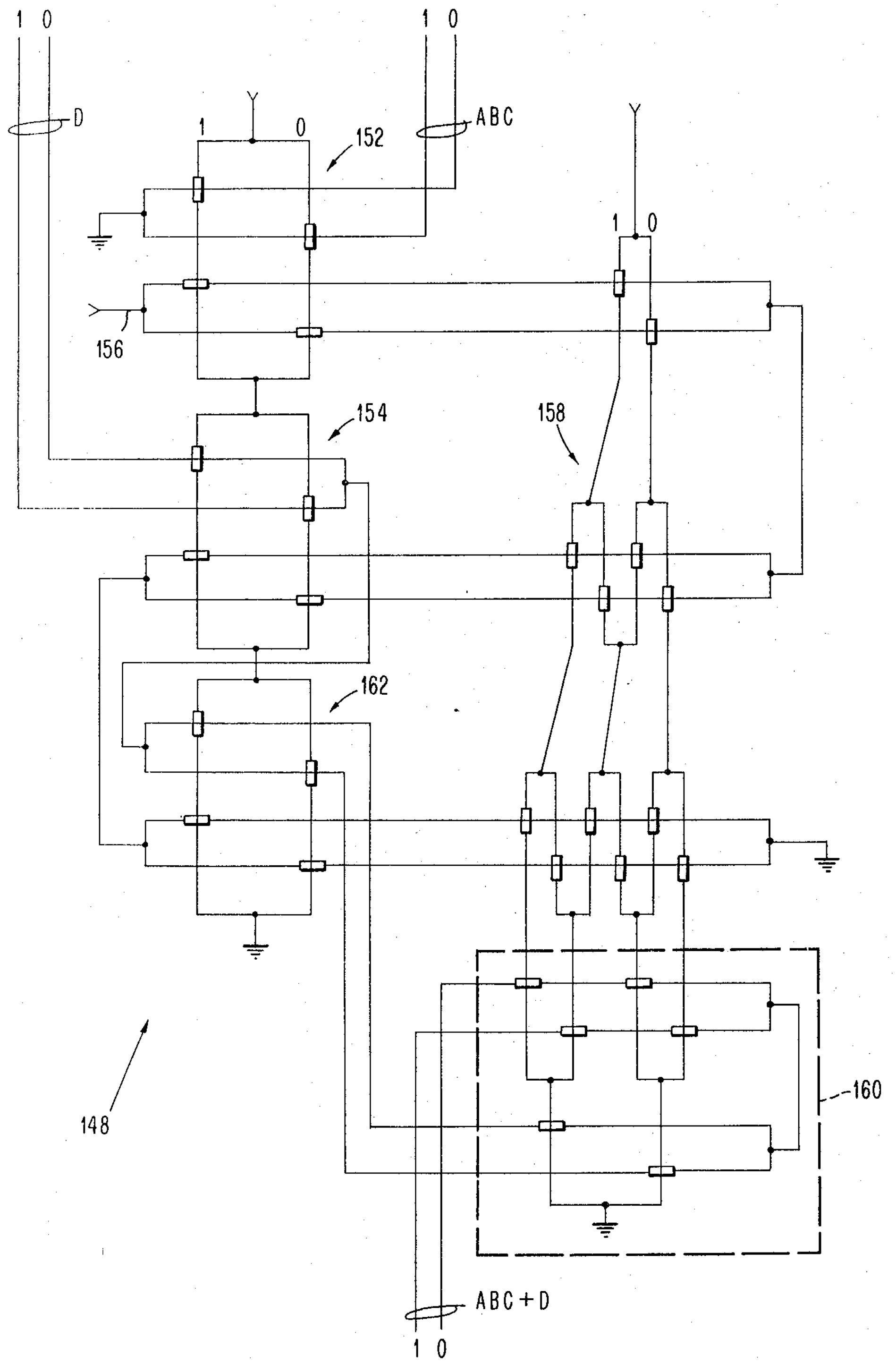

And FIG. 7 is a schematic diagram of a cryogenic embodiment of a serial adder which may be employed in the system of FIG. 4.

Referring more particularly to FIG. 1, there is shown a multiplier register 9 for receiving and storing the multiplier digits, and a multiplicand register 10 for receiving and storing the multiplicand digits. Information from the individual digit positions of these registers is supplied to the individual coincidence or "AND" circuits 11A through 11E. The combined information available from the outputs of these "AND" circuits is gated through the gate circuits indicated at 12A through 12E to a multiple digit adder circuit comprising a counting network 13 and a coding network 14. The counting network 13 is operable to generate a digital count signal indicative of the total count of "one" digits passing through the gates 12A through 12E, and the coding network receives this count and converts the count to a binary representation in terms of a sum digit and carry digits. Each sum digit from the coding network 14 appears at the output connection 15 and indicates one digit signal of the serially produced product of the multiplier and the multiplicand. Any first order carry signal appears at connection 16 and is supplied to a storage flip-flop 17. Any second order carry signal appears on output connection 18 and is stored in flip-flop 19. The second order carry signal is later shifted down from the flip-flop 19 to the flip-flop 20, and both carries are gated into the counting network 13 through gates 12F and 12G, when appropriate.

The multiplier register 9 is comprised of individual digit storage flip-flops 9A through 9E, and the multiplicand register 10 is comprised of individual digit storage flip-flops 10A through 10E. The multiplier digits are written into the multiplier register 9 with the lowest order digit in flip-flop 9A and the highest order digit in flip-flop 9E and with intermediate digits correspondingly arranged. The multiplicand register 10 is a serial read-in shift register in which the multiplicand enters serially, with the low digit first, into flip-flop 10A. And the low digit shifts to flip-flop 10B as the second order digit is written into flip-flop 10A etc.

In operation, the multiplier is first stored as described above, in register 9. The multiplicand is then shifted into register 10, proceeding from low order to high order, commencing with flip-flop 10A. As each new digit is shifted in, the previous digits are shifted downward one digit position by means of a common shift control circuit indicated at 21. This occurs during what is termed a shift cycle time. After each write-in and shift operation, the gate circuits 12A through 12G are operated under a common gate control signal circuit indicated at 22. This occurs during what is termed a read cycle time. In this manner, as the multiplicand shifts into and through the multiplicand register 10 the resultant product of the multiplicand and the multiplier is generated in serial form at the output connection 15. Multiplicand digits shifted out of the last multiplicand register flip-flop 10E are discarded, as they are no longer needed for the multiplication. If it is desired to save the multiplicand, a separate storage register or memory (not shown) may be provided to store the multiplicand as it is shifted out of flip-flop 10E.

The shift control 21 is also connected to the carry storage flip-flop 19 to cause a shift of the second order carry from flip-flop 19 to flip-flop 20 during the shift cycle time. The coding network 14 is also connected and arranged for operation in response to the shift control signal on shift line 21 as indicated by connection 21A, so that all of the signals from the coding network 14 on lines 15, 16, and 18 are available only at the shift cycle time.

Thus, during a shift time, the multiplicand shifts in and down one digit position. During the subsequent read cycle time, when a gate pulse is available on line 22, the gates 12A through 12G are opened to provide output pulses to the counting network 13 which provides a count which is stored in the coding network 14. At the next shift cycle time not only is the multiplicand shifted in and down one digit position, but the product digit is read out of coding network 14 on output line 15, and the carry digits are transferred from the coding network 14 on lines 16 and 18 to flip-flops 17 and 19. As previously explained, any previous second order carry digit stored in flip-flop 19 is also shifted down to flip-flop 20. At the next read cycle time, when the next subsequent gate pulse is available on gate pulse line 22, any previously stored carry signals in flip-flops 17 and 20 are gated through the gates 12G and 12F to the counting network together with the signals from the AND circuits 11A through 11E which are gated through gate circuits 12A through 12E. The previously stored carries thus contribute to the binary digits counted to form the higher order sum (product).

Figure 2A:
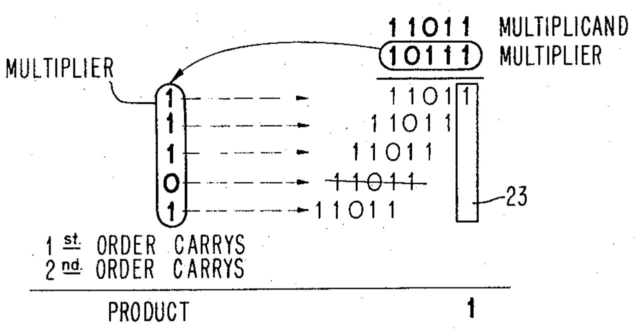

FIGS. 2*a* through 2*d* are diagrams illustrating the arithmetic principles of the operation of the system of FIG. 1. At the top of each of these diagrams there is illustrated a typical five digit binary multiplicand, and directly beneath it a typical five digit binary multiplier. Beneath the multiplier there are five partial products arranged in progressively left shifted positions as they are typically written for multiplication. The partial product corresponding to the fourth order of the multiplier is written out but crossed through to indicate the fact that no partial product for this multiplier digit is required because the multiplier digit is zero. In order to better illustrate the relationship between these diagrams and the structure of FIG. 1, the multiplier is reproduced as indicated at the left portion of each diagram, with the low order multiplier digit at the top so that each multiplier digit is lined up horizontally with the partial product corresponding thereto. In FIG. 2*a*, the box indicated at 23 illustrates the contents of the multiplicand register 10 at the time the multiplicand is first started to be shifted into the multiplicand register such that only the lowest order one bit appears therein. Immediately after this first digit is shifted in, the first summing operation takes place and as the lowest order multiplier digit is a "one," the output of the FIG. 1 AND circuit 11A indicates a coincidence and this signal passes through gate 12A and ultimately to output 15. A summing of the lowest order column of the array of partial products thus takes place.

Figure 2B:
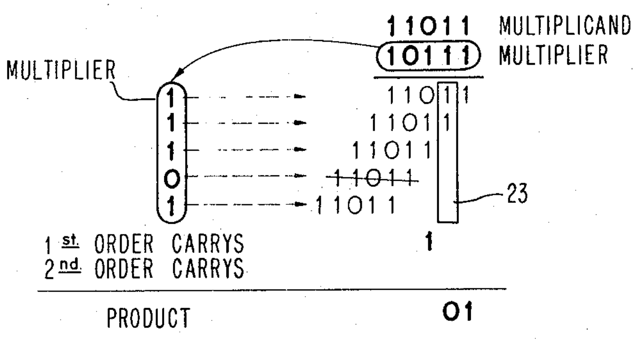

FIG. 2*b* illustrates the summing of the second order column of the array of partial products, the box 23 again illustrating the contents of the multiplicand register 10 after the next downward shift and read-in operation of the multiplicand. The second order product digit "zero" is thus obtained, and a first order carry digit is stored for summing with the third order of the array of partial products.

Figure 2C:
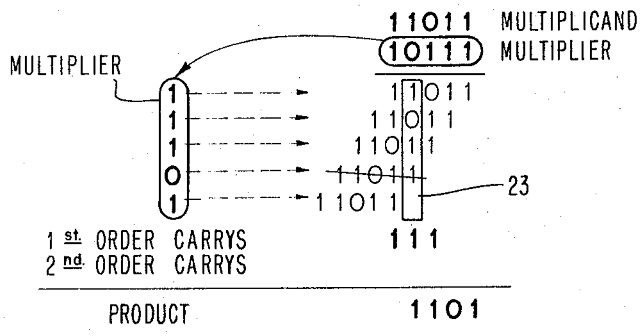

FIG. 2*c* illustrates the operation of the system two cycles later for the summing of the fourth order of the array of partial products when a total of four digits of the multiplicand have been shifted into the register 10 as again illustrated in box 23. While the lowest order multiplicand digit is now stored in the fourth flip-flop 10D of multiplicand register 10, the readout of this digit is suppressed because the multiplier digit corresponding to this level is zero. Accordingly, there is no output from the multiplier flip-flop 9D and no output from the coincidence circuit 11D.

Figure 2D:
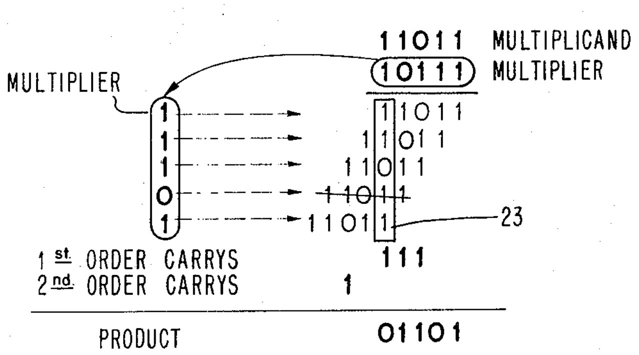

FIG. 2*d* illustrates the operation of the system on the next cycle in which a second order carry is generated and stored in flip-flop 19 of FIG. 1. It will be seen that subsequent cycles of operation will result in a continued downward shift of the multiplicand in the register 10 until the multiplicand is completely shifted out of that register and the summing of the array of partial products is complete. From this explanation it is apparent that as long as the multiplier does not exceed five digits, the apparatus of FIG. 1 is capable of handling the multiplication of a multiplicand of any size in numbers of digits by simply providing additional cycles of operation. For operation with larger multiplicands, no more than five multiplicand digits are ever stored in the multiplicand register 10, but these are the only digits which are necessary in the summing of the array of partial products on any one cycle of the serial operation. As mentioned above, in FIG. 1, as the multiplicand digits are shifted through register 10 and out of the last flip-flop 10E, they are simply discarded as they are no longer necessary. If it is desired to save the multiplicand for future reference, an additional storage register (not shown) may be connected to receive the multiplicand digits as they are shifted out of flip-flop 10E.

The system of FIG. 1 is particularly well adapted for embodiment in cryogenic circuitry employing cryotron switching devices. A detailed schematic circuit diagram of such a multiplier is shown in FIG. 5. However, before proceeding with a more detailed description of the system of FIG. 5, a description of the cryotrons and the cryotron circuit notation employed in FIG. 5 is given below in conjunction with FIGS. 3 and 4.

The term "cryotron" as used in the present specification refers to cryogenic gating devices composed of materials which are said to be normally superconductive when maintained at very low temperatures such as may be achieved by immersion in liquid helium, for example. These cryotron gating devices include a main or gate conductor of superconductive material and a separate control conductor arranged such that when a current is provided in the control conductor, it is effective to produce a magnetic field which causes the gate conductor to lose at least some of its superconductive properties so that the gate conductor becomes resistive.

FIG. 3 illustrates such a cryotron device 24 having a control winding 26 around a gate element 28. The current to be gated or controlled flows through the gate element 28 between terminals 30 and 32, while the control current which causes such gating flows through the winding 26 between terminals 34 and 36.

In FIG. 4, the cryotron of FIG. 3, is illustrated in a simplified form, the same reference numerals being employed to designate corresponding parts. It is to be seen that the only difference is that the winding 26 is represented in FIG. 4 simply by a conductor disposed across gate element 28. This simplified representation of a cryotron is employed in all of the remaining figures showing cryogenic embodiments of the present invention. In these systems, the circuit lines or wires and the control conductor or winding 26 of each cryotron may be composed of a so-called "hard" superconductor material such as niobium or lead. On the other hand, the gate element 28 of each cryotron is composed of a "soft" superconductor material such as tantalum or tin, for instance. The current employed is such that the current in the control winding 26 creates a magnetic field which exceeds the critical field value to cause the gate to become resistive, but the field does not exceed such a critical value with respect to the material of the control winding 26 and the interconnecting lines and wires, so that these elements remain substantially superconductive.

When two gate conductors are electrically connected in parallel, one being superconducting and the other being resistive, a current flowing to the parallel combination will flow entirely through the superconducting gate, although the other gate may exhibit only a few tenths of an ohm resistance. Then, if the resistive gate is allowed to become superconducting, the current will continue to flow through the original superconducting gate. Thus, current is caused to flow through a selected path which is maintained superconducting and such current will continue to flow in that path even if other parallel paths later become superconducting.

If is to be understood that the cryotron devices may be constructed of thin films such as are shown and described in co-pending application Serial No. 625,512 filed November 30, 1956, by R. L. Garwin and entitled, "Fast Cryotrons," and assigned to the same assignee as the present invention. Additional information on cryogenic superconductive gating devices and certain logical circuits which may be created with such devices is contained in an article by D. A. Buck entitled, "The Cryotron—A Superconductive Computer Component," in Proceedings of the IRE, volume 44, No. 4, pages 482–493, April 1956.

FIG. 5 shows how FIGS. *5a* and *5b* are to be combined to form a schematic diagram of a cryogenic embodiment of the multiplier of FIG. 1. FIGS. *5a* and *5b* will sometimes be referred to collectively below as FIG. 5. In the embodiment of FIG. 5, in so far as possible, the parts and components of the system are identified by the same numbers as were used for the corresponding parts of FIG. 1.

In FIG. *5a*, the multiplier register 9 consists of a series of cryogenic flip-flops 9A through 9E. These flip-flops each consist of two parallel current circuit paths, a current in the right hand circuit path indicating a "zero," and a current in the left hand circuit path indicating a binary "one" in each flip-flop. In the 9A flip-flop a pair of cryotrons 38A and 40A are provided having gate elements connected to the flip-flop current circuits and having control windings connected to receive write-in signals indicating the lowest order multiplier digit. Flip-flops 9B through 9E are similarly provided with cryotrons 38B and 40B through 38E and 40E to receive write-in signals indicating the binary value of the second and higher order multiplier digits. The multiplier write-in cryotron lines 41 are arranged so that the digits of the multiplier may be written in parallel. However, it will be apparent that the multiplier could also be stored in a serial fashion by progressively switching the input signals to the various pairs of input lines 41, or all of the multiplier digits may be brought in at one of the end flip-flop positions if the register is constructed as a shift register. After the multiplier is stored in the multiplier register 9, then the multiplicand may be shifted into the system one binary digit at a time at the multiplicand input lines 42. The lowest order multiplicand digit is thus stored in the first multiplicand register flip-flop 10A. The flip-flop 10A is again an alternate current cryogenic flip-flop having write-in cryotrons 44A and 46A, each of which have control windings controlled by the input lines 42. The other flip-flops 10B through 10E of register 10 are similarly equipped with write-in cryotrons 44B and 46B through 44E and 46E, the operation of which will be described more fully below.

In the cryogenic embodiment of FIG. 5, the gating function described in FIG. 1 by reference to gate devices 12A through 12G is accomplished simply by supplying a current to read out circuits at the time when the transfer of information is to be accomplished. Thus, the gate line 22 in the upper right hand corner of FIG. *5a* is provided with a gating pulse from a standard source of current (not shown) and this pulse causes a transfer of information from multiplicand register 10 and multiplier register 9 to the counting network 13. This information is read out of flip-flop 10A by means of a control of current accomplished by cryotrons 48A and 50A having control windings respectively connected in series in the 10A flip-flop circuits and having gates connected in the read out circuits. The gate of cryotron 48A is in the "zero" read out line and the gate of cryotron 50A is in the "one" read out line. The function illustrated by the AND circuits or coincidence circuits 11A through 11E of FIG. 1 is combined in the cryogenic embodiment of FIG. 5 with the function of reading out the binary information stored in the individual multiplier register flip-flops. Thus, a cryotron 52A having a control winding in the "one" side of multiplier flip-flop 9A indicates a "one" value stored in that flip-flop and cryotron 54A similarly indicates a "zero" value stored in flip-flop 9A. A one value carried to the counting network 13 is registered by a current in the control winding of counter network cryotron 56A, and a corresponding zero value is indicated by a current in the control winding of the counter network cryotron 58A. In this read out circuit, a "one" value stored in the multiplicand register flip-flop 10A, as indicated by a current through the gate of cryotron 50A is "ANDed" with a "one" value stored in multiplier register 9A by a continuation of a current through the gate of cryotron 54A to the control winding of counting network cryotron 56A. This read out circuit path will be effective because cryotrons 48A and 52A each have their gates closed by current in their control windings by a reason of the storage of "ones" in both of the flip-flops 10A and 9A. However, if a "one" is stored in flip-flop 10A and a "zero" is stored in the multiplier flip-flop 9A, then the gate of cryotron 54A is closed and the read out current from the gate of cryotron 50A is transferred through the gate of cryotron 52A to the "zero" read out line to the control winding of cryotron 58A. Similarly, if a zero is stored in flip-flop 10A, then the gate of cryotron 50A will be closed and the read out current will be directed through the gate of cryotron 48A to the zero line including the control winding of cryotron 58A. Thus, a one value is read out to cryotron 56A, only if "ones" are stored in both flip-flops 10A and 9A. Otherwise, the count received at the counting network 13 for this level is zero. Thus it is to be seen that the AND or "coincidence" function is accomplished by these circuits for any stored ones.

The circuitry for subsequent levels of the registers and the counting network 13 are substantially identical in structure and operation. However, the counting network 13 broadens out to give one additional output line at each level in order to provide the capacity for indicating a count of an additional one digit at each level. The counting network 13, as shown, is capable of counting a total of up to seven "one" digits as indicated by a signal on one of the eight lines which provide an input to the coding network 14. The additional switching required in the counting network is provided by adding an additional pair of cryotrons at each counting network level. These cryotrons are numbered up to 82G. A counting network current which enters the top of the counting network at 84, from a standard current source (not shown) is thus switched progressively in the various counting network levels to indicate a count in terms of a current on only one of the eight counting network output lines. Because of the inherent retention of information of cryogenic switching circuits, when the read out current pulse from the line 22 is discontinued, the count obtained by the counting network is retained and is available at the coding network 14. The coding network 14 is operable during the next shift control signal and after the discontinuance of the read out signal. The operation of the coding network will be described more fully below.

In the multiplicand register 10, intermediate cryogenic flip-flops are provided for intermediate storage of the information in each of the first four main register flip-flops 10A through 10D for shifting that information to the next lower flip-flop. These intermediate flip-flops are respectively provided with write-in cryotrons 84A and 86A through 84E and 86E. By means of the control exercised by these cryotrons, the intermediate storage flip-flops of register 10 are set to store the same information as is stored in the corresponding main register flip-flop by the read out current from input connection 22 at the same time that the information is transmitted to counting network 13. After the read cycle time current pulse, the information is transferred from each intermediate flip-flop to the next lower main flip-flop by a shift current pulse supplied from a standard current pulse source (not shown), as indicated at 21. The information is transferred, for instance, from the first intermediate flip-flop, including cryotrons 84A and 86A, by the gating of the shift current through the gates of cryotrons 88B and 90B having control windings in the intermediate flip-flop current lines. These cryotrons control the current to the write cryotrons 44B and 46B of flip-flop 10B in the second digit position. Thus, the information stored in flip-flop 10A is shifted to flip-flop 10B by a cycle including a read out or gating current pulse at connection 22 followed by a shift current pulse at connection 21. At the shift cycle time, when the shift current pulse at 21 is applied any new multiplicand digit which is available is written into flop-flop 10A from connections 42. The shift structures for the succeeding digit positions of multiplicand register 10 are similar, and operate in a similar manner to accomplish a simultaneous downward shift within the register 10 as each new multiplicand digit arrives at connections 42.

It is seen that the shift current from connection 21 continues down through all of the digit positions of register 10 and supplies a current which transfers information from the second order carry output connections 18 to the second order carry flip-flop 19. The second order carry digit is thus written into the flip-flop 19. In like manner, the first order carry information is provided on lines 16 to the first order carry flip-flop 17 and the same current then provides the output digit signal at lines 15. This shift current is also effective to shift a previously stored digit from flip-flop 19 to flip-flop 20 to provide an additional cycle of delay as required for the second order carry signal.

The coding network 14 is effective to convert the "zero" through "seven" count from the counting network to binary form, including a binary sum (product) digit, a first order carry digit indicative of a component count of "two," and a second order binary carry digit indicative of a component count of "four." In order to obtain the appropriate sum (product) digit, it is only necessary to determine whether the count is odd or even, an even count requiring a "zero" sum, and an odd count requiring a "one" sum digit. This switching is accomplished in network 14 by the even count cryotrons 92 through 98 and the odd count cryotrons 93 through 99. Thus, a current on any of the count lines zero, two, four, or six causes an output current from the "zero" sum (product) line.

In a similar fashion, in the first order carry circuit, cryotrons 100 and 102 are provided with control windings which carry the currents from the zero or one counts, or from the four or five counts, providing for a zero first order carry as required in the binary conversion. Similarly, cryotrons 104 and 106 are responsive to the currents respectively from the two and three counts and from the six and seven counts. For the control of the second order carry signals cryotrons 108 and 110 are provided which are respectively responsive to the count currents for values zero to three and four to seven.

Each of the carry storage flip-flops 19, 20, and 17 are provided with write-in cryotrons as indicated 112 and 114 for flip-flop 19, at 116 and 118 for flip-flop 20, and at 120 and 122 for flip-flop 17. It is to be seen that these flip-flops correspond very closely in structure to the storage flip-flops of register 10. The carry information is written into flip-flops 19 and 17 just as the incoming multiplicand bits are written into flip-flop 10A during the shift cycle time. Each of these flip-flops is provided with read out cryotrons as indicated at 124 through 134. The read out from flip-flop 19, accomplished by means of cryotrons 124 and 126, is only for the purpose of storing the second order carry in the intermediate flip-flop including cryotrons 136 and 138. From this intermediate flip-flop, the second order carry is written into the flip-flop 20 upon the occurrence of the next shift pulse by means of read out cryotrons 140 and 142. During the read cycle pulse time the information from the carry storage flip-flops 20 and 17 is transmitted into the counting network 13. This occurs with respect to any first order carry on the first read cycle pulse time after the storage of that first order carry in flip-flop 17, and it occurs with respect to any second order carry upon the second read cycle pulse time after the storage of that second order carry in flip-flop 19.

In the FIG. 5 circuit diagram, a single current circuit path is employed for supplying a current for all of the register storage flip-flops, including the main and intermediate flip-flops of register 10 and the flip-flops of register 9. It will also observed that a single series current circuit is provided for all of the read out circuitry from the read out supply connection 22. Also, a single series current circuit arrangement is employed for all of the shift circuits supplied from connection 21. This extended use of the same current source is one of the advantages of cryogenic circuitry. However, it will be appreciated that in an actual physical embodiment of the present invention it may be advantageous to employ additional parallel sources of current, and to reduce the number of circuit elements which are connected in series circuit relationship. However, such a change would not represent any substantial departure from the circuit as shown in FIG. 5.

In the descriptions of the embodiment illustrated by FIGS. 1 and 5 it is assumed that a source of signals is available to supply the multiplier, either in parallel or serial form, and to supply the multiplicand in serial form. Since these sources of information signals may be of conventional construction, for the purpose of simplicity and clarity in the description of the present invention, they are not shown. Similarly, it is assumed that some storage register or further utilization device is available to receive the serially produced product signals appearing at output connections 15, and again, since such devices may be of conventional construction, they are not shown.

From the above descriptions of the operation of the systems of FIGS. 1 and 5 it is clear that after the multiplier is stored in register 9, as soon as the lowest order multiplicand digit is written into register 10A, the next read out pulse from connection 22 will cause the transfer of the first count into the counting network 13. And upon the occurrence of the next shift cycle time, the shift pulse current from connection 21 will cause the first product digit to appear at output connections 15. This will occur at the same time that the second multiplicand digit is written into flip-flop 10A. Thus, there is a delay of only one serial digit operating time between the insertion of a multiplicand digit and the emission of a resultant product digit. It is apparent that this operating time or cycle includes one write-in or shift pulse period (shift cycle time) and one read out pulse period (read cycle time). This is regarded as a remarkably short operating cycle for a multiplication operation. Indeed, it is comparable to the operating cycle expected for a mere addition operation.

It is one of the features of the present invention to make use of this short multiplier cycle by producing larger arithmetic systems employing a number of cascade-connected arithmetic units and in which involved arithmetic functions may be derived which may require several multiplications and which may also involve additions.

FIG. 6 illustrates such a system, in which a first multiplier 144 according to the teachings of the present invention may be connected to receive factors A and B and to supply the product AB in serial digit by digit fashion to a second multiplier 146. As discussed above, the individual digits of the product AB are produced with a delay time of only one serial digit operating cycle after the receipt of the corresponding multiplicand digit of factor A. The second multiplier 146 is also constructed in accordance with the teachings of the present invention as illustrated in FIGS. 1 and 5, and it is arranged to produce the product ABC, digit by digit, with a delay of only one digit cycle after the receipt of the respective AB product digits. The ABC product digits are supplied to a serial adder 148 which is also operable with a one digit cycle delay to produce, digit by digit, the arithmetic quantity $ABC+D$. This quantity is supplied to a third multiplier 150 which again is operable in serial fashion to produce the arithmetic quantity $(ABC+D)E$. It is apparent that the system of FIG. 6 is only illustrative of the combinations of cascaded arithmetic elements which are possible in accordance with the teachings of the present invention. It is believed to be quite remarkable that, in this system, the rather involved function $(ABC+D)E$ begins to appear in serial fashion only four digit cycles after the first digit of the factor A appears at the input of the first multiplier 144.

FIG. 7 shows the structure of a cryogenic serial adder which may be employed in the systems such as FIG. 6 of the present invention. While other serial adders could be employed, the adder of FIG. 7 is illustrated because it is clearly compatible with the cryogenic embodiment of the multiplier previously described in connection with FIG. 5. This circuit is identified as a whole as 148 since it is so identified in FIG. 6. Also, the input lines are identified by the factors which they receive in the embodiment of FIG. 6, and the output lines are similarly identified by the sum $ABC+D$ produced by the adder 148 in the system of FIG. 6. The circuitry of the adder is quite similar to that described in connection with FIG. 5 for the multiplier. The incoming digit of factor ABC is stored in cryogenic flip-flop 152, and the corresponding digit of factor D is stored in a flip-flop 154 during the shift cycle time. Subsequently, during the read cycle time, these two factors are transferred by a read pulse appearing at connection 156 to be counted in a counting network 158. The count is coded into a binary sum and a carry by the coding network indicated at 160, and the carry digit is stored in flip-flop 162. At the next shift cycle time, the carry digit from flip-flop 162 is transferred to the counting network 158 together with the new input digits stored in flip-flops 152 and 154. Thus, it is clear that the adder circuit of FIG. 7 produces binary sum digits in serial digit by digit fashion with a one digit time delay in a manner which is entirely compatible with the multiplier described in connection with FIG. 5 and under the control of the same timed shift and read cycle time pulses.

In the multiplier of FIG. 5, for the purpose of simplicity and clarity, the apparatus is illustrated with a capability of handling a binary multiplier of only five digits. As was pointed out above, even this limited structure is capable of handling a multiplicand of any size by simply prolonging the number of serial operations. It is quite apparent that the size of the multiplier can be easily increased without departing from the teachings of the present invention. For instance, additional levels for added digit positions could be provided in both of the registers A and 10, and in the counting network 13. For this purpose, it would be necessary to modify the coding network 14 to provide for higher order carries above the second order carry and to provide additional delay circuitry for storing and appropriately delaying these higher order carries. However, it is apparent that these modifications could be made by simply following the teachings of the embodiment of FIG. 5.

A number of features of the circuitry of FIGS. 5 and 7 are similar to features disclosed in our prior patent application Serial Number 79,823, filed December 30, 1960, and entitled "Calculating Memory," now Patent No. 3,141,964, and assigned to the same assignee as the present application. This statement applies particularly to the counting network 13 and the coding network 14.

While the invention has been particularly shown and described with reference to preferred embodiments thereof, it will be understood by those skilled in the art that various changes in form and details may be made therein without departing from the spirit and scope of the invention.

What is claimed is:

1. A serially operable binary multiplier system comprising a register having flip-flops for storing the digits of the multiplier, a register having flip-flops for storing the digits of the multiplicand, at least one of said registers being a shift register, the individual digit flip-flops of said multiplier register being paired in ascending digital order with individual digit flip-flops of said multiplicand register in descending digital order, each pair having an individual coincidence circuit connected therewith, a multiple digit adder comprising at least one counting network connected to receive the outputs from all of said coincidence circuits and operable to generate a count of all the one digits indicated thereby, and a coding network connected to receive the count from said counting network and operable to generate binary sum digits and carry digits representative of said count, the system being operable to read out digits from each of said registers at a read cycle time indicating a coincidence of ones in said flip-flop pairs for the generation of a sum representing the sum of one column of an array of partial products, said registers being operable to provide a relative shift of one digit position between said multiplier and said multiplicand after each read cycle time to then cause the representation of the next higher order of said array of partial products, and delay storage apparatus connected to receive and store each carry digit for addition in said adding circuit on a subsequent read cycle.

2. A serially operable binary multiplier system comprising a register having flip-flops for storing the digits of the multiplier, a register having flip-flops for storing the digits of the multiplicand, at least one of said registers being a shift register, the individual digit flip-flops of said multiplier register beng paired in ascending digital order with individual digit flip-flops of said multiplicand register in descending digital order, each pair having an individual coincidence circuit connected therewith, a multiple digit adder circuit comprising at least one counting network connected to receive the outputs from all of said coincidence circuits and operable to generate a count of all one digits indicated thereby, and a coding network connected to receive the count from said counting network and operable to generate binary sum digits and carry digits representative of said count, gating means connected to gate said coincidence circuit outputs to said counting network at a read cycle time, said registers being operable to provide a relative shift of one digit position between said multiplier and said multiplicand at a shift cycle time after each read cycle time, and delay storage means comprising flip-flops connected to receive and store each carry digit, said gating means being connected to gate each of said carry digits to said adding circuit at a subsequent read cycle time.

3. A multiplier system serially operable in successive digit cycles in which the digit cycles each include a shift cycle time and a read cycle time comprising a register having flip-flops for storing the digits of the multiplier, a register having flip-flops for storing the digits of the multiplicand, at least one of said registers being a shift register and being operable to provide a relative shift of one digit position between said multiplier and said multiplicand at each shift cycle time and being arranged to receive any new available digit at one end digit flip-flop position at the same time, the individual digit flip-flops of said multiplier register being paired in ascending digital order with individual digit flip-flops of said multiplicand register in descending digital order, a multiple-digit adder comprising a counting network operable to generate a count of a plurality of "one" digits in terms of a current in only one of a plurality of output lines, the members of each of said pairs being connected together to said counting network in a combined read and coincidence circuit operable during said read cycle time to transmit a "one" digit to said counting network in response to the condition of "ones" stored in both members of said pair, a coding network connected to receive the count from said counting network during said read cycle time and operable during said shift cycle time to generate binary sum and carry digits representative of said count, carry storage flip-flops connected to receive and store each carry digit during said shift cycle time, and carry read circuits connected from said carry storage flip-flops to said counting network and operable during the next subsequent read cycle time to transfer carry signals stored therein to said counting network.

4. A serial cryogenic binary multiplier system operable in successive digit cycles each including a shift cycle time and a read cycle time comprising a register having alternate current cryotron gated flip-flop circuits for storing the digits of the multiplier, a register having alternate current cryotron-gated flip-flop circuits for storing the digits of the multiplicand, at least one of said registers being a shift register operable during said shift cycle time to shift the digits stored therein by one digit position and to receive any new available digit through writing connections at one end digit flip-flop position, a multiple digit adder comprising a cryotron-gated counting network operable to generate a count of a plurality of "one" digits in terms of a current in only one of a plurality of output lines, the individual digit flip-flops of said multiplier register being paired in ascending digital order with individual digit flip-flops of said multiplicand register in descending digital order by means of crytron-gated coincidence circuits each operable during said read cycle time and connected to transmit a "one" signal to said counting network in response to a coincidence of ones of the associated pair of flip-flops by controlling cryotron-gates in said counting network, a coding network connected to receive the count signal from said counting network during said read cycle time and operable through cryotron gates controlled thereby to generate a binary sum digit and carry digits representative of said count during said shift cycle time, alternate current cryotron-gated flip-flop circuits connected to receive and store each carry digit, and carry read circuits connected to transmit each stored carry to said counting network during a subsequent read cycle time.

5. A serial arithmetic system for forming an arithmetic function of at least three factors with a delay of one digit operating cycle for each factor in addition to the first factor in which the digit cycles each include a shift cycle time and a read cycle time, said system comprising a plurality of cascade-connected arithmetic units, at least one of said units being a multiplier unit connected and arranged to receive the output from any earlier arithmetic unit as a multiplicand and to receive a new factor as a multiplier, said multiplier unit comprising a register having flip-flops for storing the digits of the multiplier, a register having flip-flops for storing the digits of the multiplicand, said multiplicand register being a shift register and being operable to provide a shift of one digit position at each shift cycle time and being arranged to receive any new available digit at one end digit flip-flop position at the same time, the individual digit flip-flops of said multiplier register being paired in ascending digital order with individual digit flip-flops of said multiplicand register in descending digital order, a multiple-digit adder comprising a counting network operable to generate a count of a plurality of "one" digits in terms of a current in only one of a plurality of output lines, the members of each of said pairs being connected together to said counting network in a combined read and coincidence circuit operable during said read cycle time to transmit a "one" digit to said counting network in response to the condition of "ones" stored in both members of said pair, a coding network connected to receive the count from said counting network during said read cycle time and operable during said shift cycle time to generate binary sum and carry digits representative of said count, carry storage flip-flops connected to receive and store each carry digit during said shift cycle time, and carry read circuits connected from said carry storage flip-flops to said counting network and operable during the next subsequent read cycle time to transfer carry signals stored therein to said counting network.

6. A serially operable multiplier system for forming a product of at least three factors and comprising at least two multiplier units operable to deliver the three factor product in serial digit form with a delay of two digit operating cycles, the first of said multiplier units being arranged to receive two of said factors, the second of said multiplier units being arranged to receive the third factor and being connected to receive the two factor product output from the first multiplier, each of said digit cycles including a shift cycle time and a read cycle time, each of said multiplier units comprising a register having flip-flops for storing the digits of the multiplier, a register having flip-flops for storing the digits of the multiplicand, said multiplicand register being a shift register and being operable to provide a shift of one digit position at each shift cycle time and being arranged to receive any new available digit at one end digit flip-flop position at the same time, the individual digit flip-flops of said multiplier register being paired in ascending digital order with individual digit flip-flops of said multiplicand register in descending digital order, a multiple-digit adder comprising a counting network operable to generate a count of a plurality of "one" digits in terms of a current in only one of a plurality of output lines, the members of each of said pairs being connected together to said counting network in a combined read and coincidence circuit operable during said read cycle time to transmit a "one" digit to said counting network in response to the condition of "ones" stored in both members of said pair, a coding network connected to receive the count from said counting network during said read cycle time and operable during said shift cycle time to generate binary sum and carry digits representative of said count, carry storage flip-flops connected to receive and store each carry digit during said shift cycle time, and carry read circuits connected from said carry storage flip-flops to said counting network and operable during the next subsequent read cycle time to transfer carry signals stored therein to said counting network.

7. A multiplier system operable in successive digit cycles each including a shift cycle time and a read cycle time comprising a register having alternate current cryotron-gated flip-flop circuits for storing the digits of the multiplier, a register having alternate current cryotron-gated flip-flop circuits for storing the digits of the multiplicand, said multiplicand register being a shift register operable during said shift cycle time to shift the digits stored therein by one digit position and to receive any new available digit through writing connections at one end digit flip-flop position, a multiple digit adder comprising a cryotron-gated counting network operable to generate a count of a plurality of "one" digits in terms of a current in only one of a plurality of output lines, the individual digit flip-flops of said multiplier register being paired in ascending digital order with individual digit flp-flops of said multiplicand register in descending digital order by means of cryotran-gated coincidence circuits each operable during said read cycle time, each coincidence circuit comprising a "zero" signal line and a "one" signal line into which currents are first gated by the associated multiplicand flip-flop, the coincidence circuit cryotron gates controlled by the associated multiplier flip-flop forming a cross-over network in which a "one" signal current crosses over to the "zero" line in the presence of a "zero" stored in the multiplier flip-flop but remains in the "one" line in response to a "one" stored in the multiplier flip-flop to transmit a "one" signal to said counting network in response to a coincidence of ones in the associated pair of flip-flops by controlling cryotron gates in said counting network, a coding network connected to receive the count signal from said counting network during said read cycle time and operable through cryotron gates controlled thereby to generate a binary sum digit and carry digits representative of said count during said shift cycle time, alternate current cryotron-gated flip-flop circuits connected to receive and store each carry digit, and carry read circuits connected to transmit said stored carries to said counting network during a subsequent read cycle time.

8. A cryogenic multiplier system for rapidly forming a product of at least three factors and comprising at least two multiplier units connected in cascade, the first of said multiplier units being arranged to receive one of said factors as a multiplier and to receive the other of said factors serially as a multiplicand the the second of said multiplier units being arranged to receive the third factor as a multiplier and being connected to receive the two factor product output from the first multiplier as a multiplicand and operable to deliver the three factor product in serial digit by digit form with a lag of two serial digit operating cycles after receipt of the multiplicand factor by said first multiplier unit, each of said digit cycles including a shift cycle time and a read cycle time, each of said multiplier units comprising a register having alternate current cryotron-gated flip-flop circuits for storing the digits of the multiplier, a register having alternate current cryotron-gated flip-flop circuits for storing the digits of the multiplicand, said multiplicand register being a shift register operable during said shift cycle time to shift the digits stored therein by one digit position and to receive the input of any new available multiplicand digit through writing connections at one end digit flip-flop position, a multiple digit adder comprising a cryotron-gated counting network operable to generate a count of a plurality of "one" digits in terms of a current in only one of a plurality of output lines, the individual digit flip-flops of said multiplier register being paired in ascending digital order with individual digit flip-flops of said multiplicand register in descending digital order by means of cryotron-gated coincidence circuits each operable during said read cycle time and connected to transmit a "one" signal to said counting network in response to a coincidence of ones in the associated pair of flip-flops by controlling cryotron gates in said counting network, a coding network connected to receive the count signal from said counting network during said read cycle time and operable through cryotron gates controlled thereby to generate a binary sum digit and carry digits representative of said count during said shift cycle time, alternate current cryotron-gated flip-flop circuits connected to receive and store each carry digit, and carry read circuits connected to transmit each stored carry to said counting network during a subsequent read cycle time.

References Cited by the Examiner

UNITED STATES PATENTS

| | | | |
|---|---|---|---|
| 2,661,152 | 12/1953 | Elias | 235-194 |
| 3,004,705 | 10/1961 | Bremer | 235—164 |
| 3,016,195 | 1/1962 | Hamburgen | 235—164 |
| 3,141,964 | 7/1964 | Fleisher | 235—175 |

MALCOLM A. MORRISON, *Primary Examiner.*

ROBERT C. BAILEY, *Examiner.*

M. POKOTILOW, T. M. ZIMMER, *Assistant Examiners.*